United States Patent [19]
Zietzke et al.

[11] 3,765,025
[45] Oct. 9, 1973

[54] TIME DIFFERENTIATING PASSIVE IMPULSE GAGE

[75] Inventors: William A. Zietzke, San Jose; Alexander L. Florence, Menlo Park, both of Calif.

[73] Assignee: The United States of America as represented by the Secretary of the Air Force

[22] Filed: Dec. 11, 1972

[21] Appl. No.: 314,053

[52] U.S. Cl............................................ 346/7, 73/35
[51] Int. Cl............................................. G01d, G01l
[58] Field of Search .................... 346/7; 73/391, 35

[56] References Cited
UNITED STATES PATENTS
1,846,985  2/1932  Baskerville............................ 346/7
581,965  5/1897  Terry.................................... 73/391

Primary Examiner—Richard B. Wilkinson
Assistant Examiner—Pat Salce
Attorney—Harry A. Herbert, Jr.

[57] ABSTRACT

A passive impulse gage, having a spring loaded mass responsive to impulses and extraneous loads in nuclear tests, has a locking device to prevent reverse motion of the mass. A scribe mechanism has two spring loaded marking pins for marking a scribe plate. When the motion of the mass stops, the marking wheel is permitted to rotate to move one marking pin out of engagement with the scribe plate and to move the other marking pin into engagement with the scribe plate so that the indication due to the test impulse is displaced on the scribe plate from indications due to extraneous loads.

3 Claims, 4 Drawing Figures

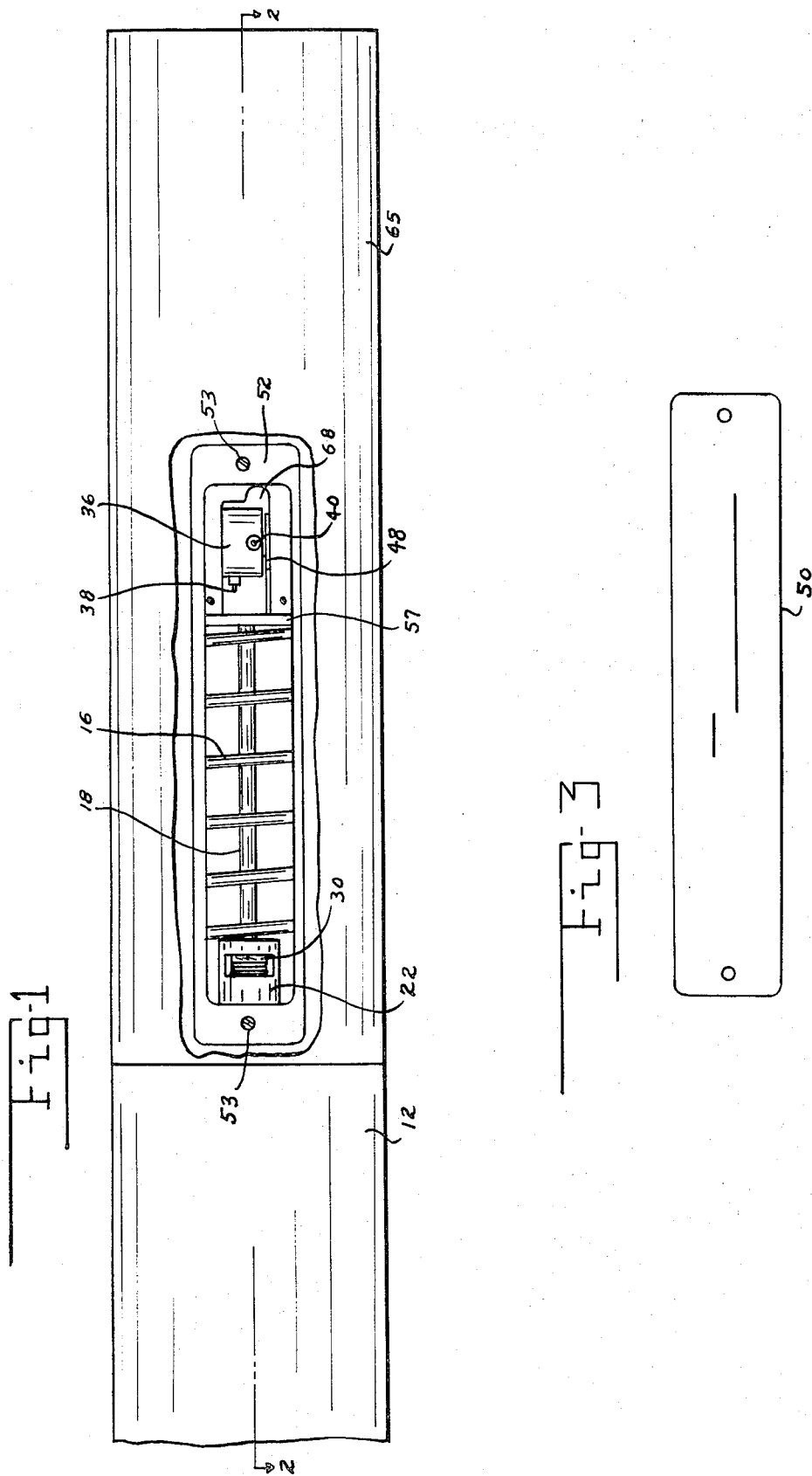

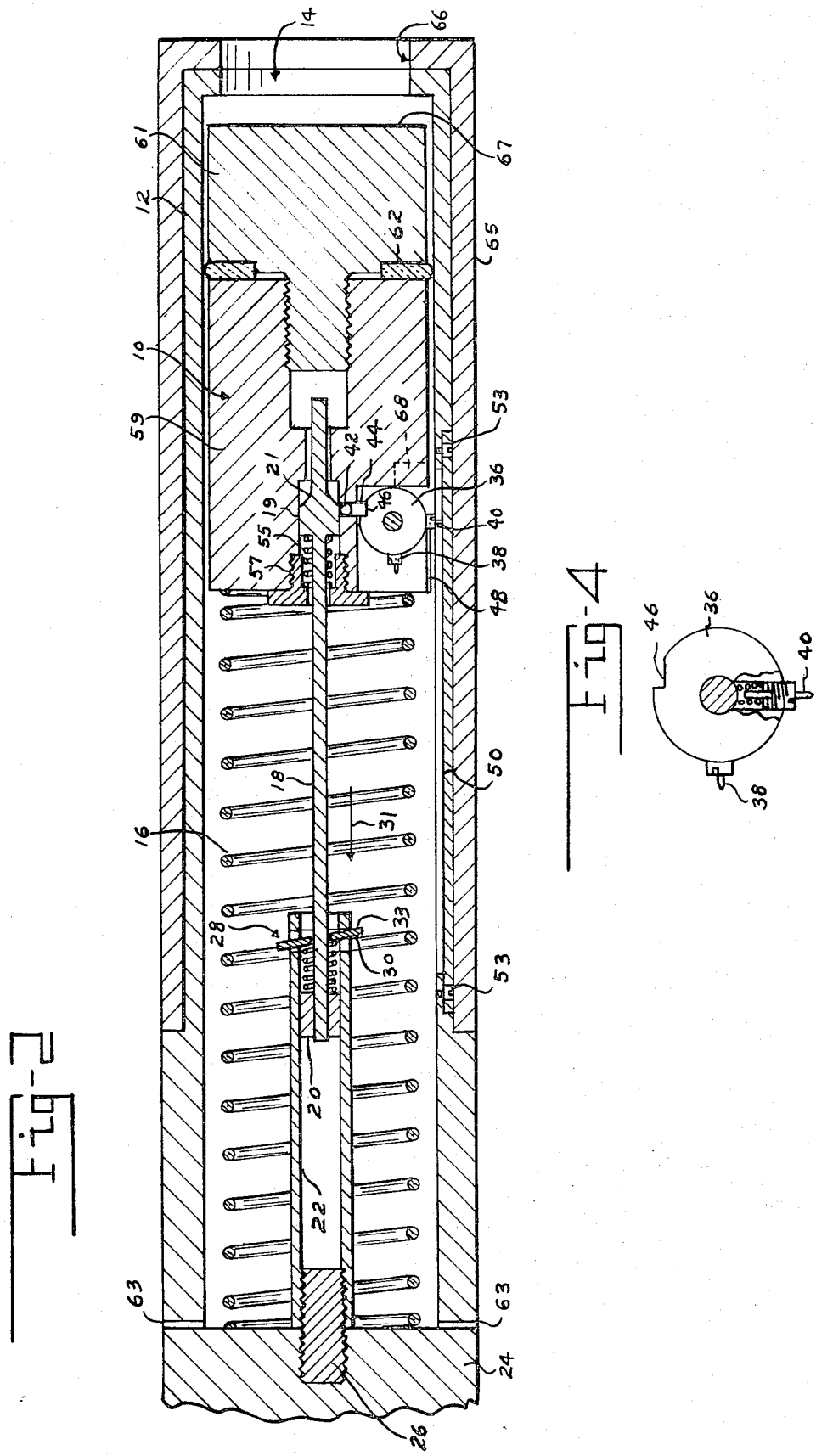

TIME DIFFERENTIATING PASSIVE IMPULSE GAGE

BACKGROUND OF THE INVENTION

In underground nuclear tests, impulses are measured with both active and passive gages. Passive impulse gages are used because they are inexpensive and provide valuable data to supplement data from active gages. They have the advantages of simple construction and ease of installation.

The five known types of passive gages are the indenter, foam, MR1, flyer plate and beam gages. In the indenter gage, the kinetic energy of a piston is absorbed by having the pointed end of the piston impact a block of metal, such as soft copper. In a foam gage, the kinetic energy is absorbed by having the flat end of a piston crush a rigid plastic foam. In the MR1 gage, the energy is absorbed by deformation of metal rings. With the flyer plate gage, the kinetic energy is absorbed by having the thin plate crush an aluminum honeycomb. The beam gage converts the impulse into kinetic energy of a cantilever which in turn is absorbed in plastic bending near the support.

These gages cannot separate certain deflections caused by impulses from those caused by extraneous loads.

One of the extraneous loads is blow off from materials adjacent the gage. Pressure from the gases formed causes deflection of the gage mass in addition to that caused by the impulse to be measured.

Hurricane loads are caused by gases rushing into the weapon end of the steel pipe containing the underground experiment when the pipe ruptures. Hurricane loads differ from those from adjacent blowoff in that they arrive approximately 100 m-sec later and last much longer.

Bulkhead shock load is caused by the impulse imparted to the bulkhead to which the gages are attached.

Ground effect loads, caused by ground motion shaking the pipe, causes acceleration of the bulkheads.

The effect of blowoff can be minimized by venting or by putting the gage in a container, such as a pipe, which keeps the gases away from the loading surface. Bulkhead shock can be minimized by shock mounting.

The two effects which are difficult to control are hurricane and ground motion loads. However, these effects are widely separated in time from the primary load.

BRIEF SUMMARY OF THE INVENTION

According to this invention, the primary load and the extraneous loads due to hurricane and ground effects are differentiated with a simple timing scheme. A spring mass gage which incorporates a recording device is provided for separating deflections caused by an impulse from those caused by extraneous loads such as those caused by ground shock, bulkhead shock and hurricanes.

IN THE DRAWINGS

FIG. 1 is a partially cut away plan view of a pressure impulse gage according to the invention, with the marking plate removed.

FIG. 2 is a sectional view of the device of FIG. 1 along the line 2—2, with the marking element shown in full and the marking plate in place.

FIG. 3 shows a marking plate for the device of FIG. 1.

FIG. 4 is a partially cut away view of the scribe wheel for the device of FIG. 1.

DETAILED DESCRIPTION OF THE INVENTION

Referring now to FIGS. 1 and 2 of the drawing, a mass 10 is located within a chamber 12. The chamber 12 has an opening 14 at one end to expose the mass to the impulse load. The mass 10 works against a spring 16. A rod 18 is attached to the mass 10 and passes through sleeve 20 in tubular member 22 secured to end wall 24 by threaded member 26. A conventional one way locking mechanism 28 stops the return of the mass after the impulse passes. Spring loaded tilting plate 30 permits motion in the direction of arrow 31 but wedges against rod 18 to stop the return motion, in the same manner as the one way locks on some music stands. A pressure at 33 releases the lock to permit movement of the rod and mass in a direction opposite to arrow 31.

The scribe mechanism has a rotary wheel 36 with two spring loaded marking pins 38 and 40, as shown in FIG. 4. Rod 18 has an enlargement 19 with a cam surface 21 which operates against a ball 42 to move a pin 44 into engagement with a notch 46 in wheel 36. The pin 44 holds the wheel 36 against rotation by spring 48. The marking pins make a record of movement on scribe plate 50, which are located in a recess 52 in the wall of chamber 12. Positioning screws 53 hold the plate 50 in place. Limited movement is provided between rod 18 and mass 10. A spring 55 is located within mass 10 and is held by retainer 57. The mass 10 has two parts 59 and 61 with a Teflon seal 62 held therebetween. Pressure relief holes 63 are provided in chamber 12. An outer cover member 65 with an opening 66, corresponding to opening 14, holds the scribe plate 50 in place.

In the operation of the apparatus, the scribe wheel is positioned with pin 40 against the scribe plate 50. An impulse acting against surface 67 of mass 10 moves the mass in the direction of arrow 31. When movement of mass 10 stops, locking device 28 grips the rod 18 to stop reverse movement of the rod 18. With the rod 18 held and with the spring rate of spring 16 much greater than the spring rate for spring 55, there will be relative movement between mass 10 and rod 18 so that ball 42 is permitted to move down cam surface 21 thus permitting the wheel 36 under the action of spring 48 to move pin 44 out of engagement with notch 46 and to roll marking pin 38 into engagement with scribe plate 50. Marking pin 40 is rotated into slot 68. Thus, any further movement of mass 10 in the direction of arrow 31 such as due to ground shock, bulkhead shock and hurricane will be recorded at a different position on scribe plate 50, as shown in FIG. 3.

There is thus provided a passive impulse gage which is capable of separating deflections caused by impulses from those caused by extraneous loads.

I claim:

1. A device for providing pressure impulse indications and for separating desired pressure impulse information from extraneous pressure forces, comprising: a cylindrical housing member having an opening at one end for receiving pressure impulses; a piston of predetermined mass within said housing; a spring, having a predetermined spring rate, adjacent said piston adapted to oppose the force of said pressure impulses; locking means for preventing return motion of said piston after cessation of said impulse; a scribe wheel having first and second spring loaded marking pins, said second marking pin being axially and angularly displaced from the first marking pin on said scribe wheel; a scribe plate extending along the wall of the housing member adjacent the wheel; means responsive to a stop motion of said piston mass for moving the first marking pin out of engagement with said scribe plate and for moving said second marking pin into engagement with said scribe plate whereby motion due to impulse is recorded by the first pin on the scribe plate and motion due to extraneous pressure forces are recorded by the second pin at a different position on the scribe plate.

2. The device as recited in claim 1 including a shaft attached to said piston; said means for preventing return motion of said piston being a spring loaded tilt plate locking device surrounding said shaft and adapted to lock the shaft against return motion.

3. The device as recited in claim 2 wherein the means responsive to a stop motion of the piston mass for moving said marking pins comprises: a spring for rotating said scribe wheel; means, responsive to the position of said shaft within the piston for locking the scribe wheel against rotation; means, including a spring having a lower spring rate than said first mentioned spring, for releasing the locking means for the scribe wheel, when said shaft is locked against return motion.

* * * * *